No. 620,952. Patented Mar. 14, 1899.
D. MURPHY.
BALANCE FOR UNDERCARRIAGES OF VEHICLES OR CARS.
(Application filed Aug. 30, 1897.)
(No Model.)

Witnesses

Inventor
David Murphy
By James L. Norris
Atty

UNITED STATES PATENT OFFICE.

DAVID MURPHY, OF OTAHUHU, NEW ZEALAND, ASSIGNOR OF THREE-FOURTHS TO WILLIAM McMANUS AND GEORGE WILLIAM BASLEY, OF AUCKLAND, AND ALFRED RICHARD HARRIS, OF EAST TAMAKI, NEW ZEALAND.

BALANCE FOR UNDERCARRIAGES OF VEHICLES OR CARS.

SPECIFICATION forming part of Letters Patent No. 620,952, dated March 14, 1899.

Application filed August 30, 1897. Serial No. 650,053. (No model.)

*To all whom it may concern:*

Be it known that I, DAVID MURPHY, a subject of the Queen of Great Britain, residing at Otahuhu, in the Provincial District of Auckland and Colony of New Zealand, have invented an equipoise cross-arm center-connection balance for undercarriages for regulating and maintaining the continuous equilibrium of vehicles of every description, including railway-carriages, tram-cars, and such like, of which the following is a specification, reference being had to the accompanying drawings.

This invention relates to that class of wheeled vehicles wherein crossing lever-arms are centrally pivoted together and have their free extremities flexibly or loosely connected or jointed to the vehicle-body and to the vehicle-axle for the purpose of equalizing the weight on the vehicle-springs.

The chief object of my invention is to improve the prior construction, to provide new and improved means for centrally connecting the crossing lever-arms together, and to generally improve this class of equalizers. To accomplish this object, my invention consists in the features of construction and in the combination or arrangement of parts hereinafter described and claimed, reference being made to the accompanying drawings, in which—

Figure 1:
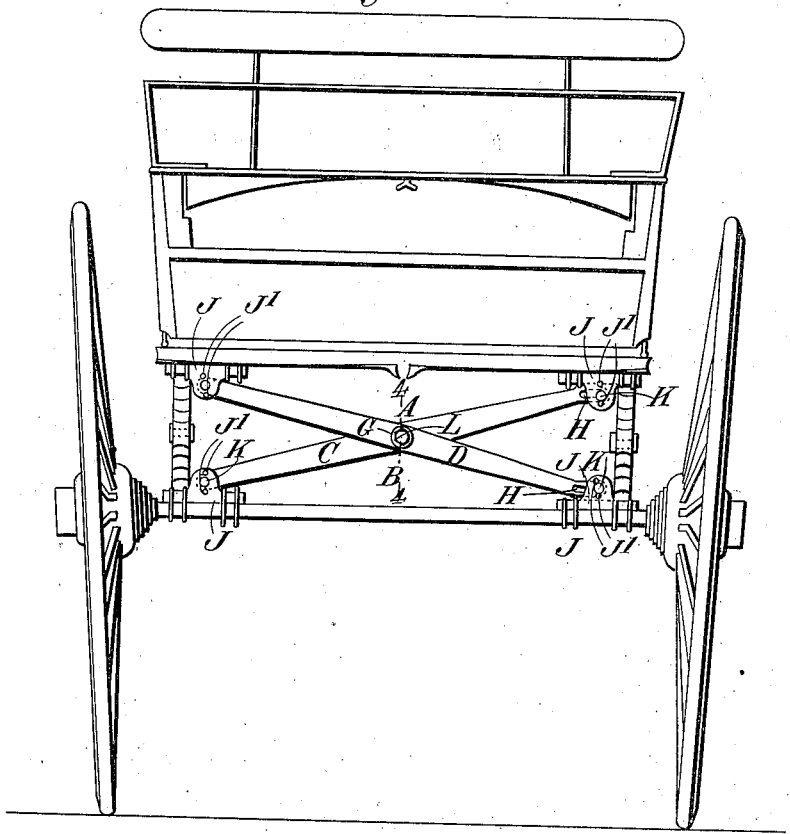
Figure 2:
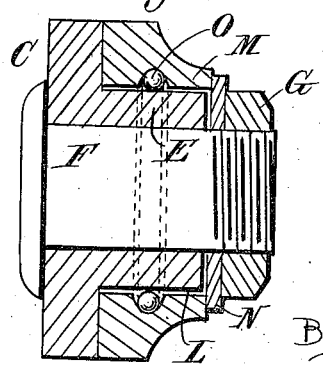

Figure 1 is a rear elevation of a wheeled vehicle with my invention applied thereto; and Fig. 2 is a cross-sectional view taken on the line 4 4, Fig. 1, to clearly illustrate the novel manner of pivotally connecting the crossing lever-arms at their centers.

The invention comprises two cross arms or bars C D, made of hard cast-steel or other suitable metal, more or less flat, and pivoted together at their center. At the pivotal point the arm C is provided with a round hollow projection or sleeve E, and the other arm D has a hole L formed therein, into which the said projection or sleeve fits, the arm D being cut out in such a manner as not only to admit the sleeve or projection, but also to admit of ball-bearings being placed between the sleeve or projection and wall of the hole L. When the cross arms or bars C D are fitted together, they are held in place by means of a bolt F, having a head at one end and a screw and nut G at the other. A boss may be used where the bolt F is longer than the combined thickness of the two arms C and D, and a washer N is used to hold the nut G tight. The projection E of the arm C and the aperture of the arm D are so arranged that the center of the bolt E coincides with the point of intersection of the two arms C and D. When connected, the projection E of the arm C, with the balls O, acts as a pivot on which the arm D moves in proportion to the weight pressing on their upper ends.

The ends of the arms C and D on one side work in bearings or brackets J J, secured to the vehicle-body and to the axle, respectively. The said arms are each provided with a slot H at this end, and the bearings or brackets have pivot-pins K passing through said slots. Instead of the above-described arrangement the slot can be formed in the bearing and the pin in the end of the arm, the result being the same in either case. In the bearing there are arranged two antifriction-rollers J', one to work above and the other below the end of the arm, to assist its movement and to prevent or minimize friction.

The bearings or brackets J have a flange on each side, so that in the case of those fitting onto the axle the outer flange is placed under and between the spring and the axle, or it may be placed on the axle just inside of the spring and the whole fastened to the axle by clips or in any other way that may be found suitable. In the case of elliptic or other form of spring where the top is fastened to the body the flanges of the bearings will be fastened as before described, but to the body instead of the axle. Where the spring is not directly fastened to the body immediately over the axle, the bearing-flanges will be fastened to the body or projections from the body in such a position as may be found most suitable.

When the bearings or brackets are fitted, as already described, to the body of the vehicle, with the cross-arms connected and in position, as hereinbefore set forth, the effect of any weight placed on the vehicle, either live or dead, provided it is not greater than the strength of the springs or arms will bear, will be to make the depression of the vehicle equal right across, one side sinking equally with the other, and the deflection of the arms will be the same, the leverage being equal, and thereby the strain on the springs will also be equal and so do away with the need of buffers, such as are now used in some cases. It is immaterial what part of the vehicle the weight is put on, as the depression and other movements above referred to will be the same.

What I claim is—

1. In a counterbalancing apparatus for vehicles, the combination with the vehicle body and axle, of a pair of crossing arms pivoted together at the center, and having their opposite ends loosely connected to the vehicle body and axle respectively, and antifriction-rollers upon which the ends of said arms act, substantially as described.

2. In a counterbalancing attachment for vehicles, the combination with the vehicle body and axle, of apertured brackets secured to the said body and axle, a pair of crossing arms pivoted together intermediate their ends and having their outer extremities freely mounted in said brackets, and antifriction-rollers journaled in said brackets and having portions thereof exposed to be acted upon by the ends of the said arms, substantially as described.

3. In a counterbalancing attachment for vehicles, the combination with the vehicle body and axle, of apertured brackets secured to said body and axle, a pair of crossing arms freely mounted at their ends in said brackets, an open sleeve E, on one of said arms, said sleeve passing through an opening in the opposite arm, a pivot-bolt F, passed through the openings in said sleeve and arm, a nut G, tapped on the end of said pivot-bolt, and antifriction-balls O, arranged between the meeting faces of the sleeve and adjacent arm, substantially as described.

In testimony whereof I have affixed my signature this 10th day of July, 1897.

DAVID MURPHY.

Witnesses:
  C. F. BENNETT,
  PERCY A. MATTHEWS.